L. BLAUL.
ROLLING-PIN.
No. 177,319. Patented May 16, 1876.
Fig. 1
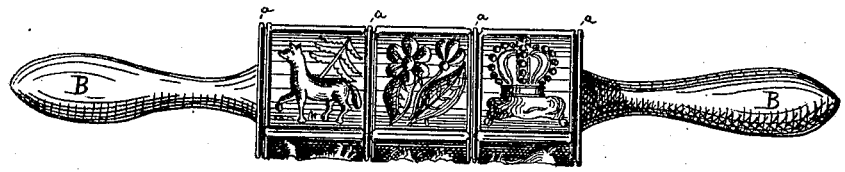
Fig. 2.
Fig. 3.
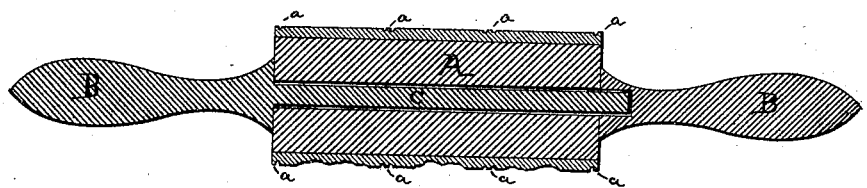
Fig. 4.
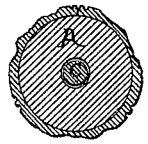
Witnesses.
W. B. Miller
Jacob Stauffer
Inventor.
Louis Blaul
N. PETERS, PHOTO-LITHOGRAPHER, WASHINGTON, D. C.

UNITED STATES PATENT OFFICE.

LOUIS BLAUL, OF LANCASTER, PENNSYLVANIA.

IMPROVEMENT IN ROLLING-PINS.

Specification forming part of Letters Patent No. 177,319, dated May 16, 1876; application filed January 8, 1876.

*To all whom it may concern:*

Be it known that I, LOUIS BLAUL, of the city of Lancaster, in the county of Lancaster and State of Pennsylvania, have invented certain Improvements in Rolling-Pins for Bakers and Confectioners, of which the following is a specification:

A highly-spiced delicious small cake, having the upper side ornamented by raised figures of various objects, is known by the name of "springerly." The tedious process for giving the embossed figures, by pressing the prepared dough into intaglio molds, neatly and deeply carved into wood for the purpose, is greatly simplified by the use of my newly-invented embossing rolling-pin.

The accompanying drawings and a brief explanation will enable those skilled in the art to make and use the same.

Figure 1 shows the form of an ordinary rolling-pin, with the intaglio figures deeply formed around or in the outer face of the roller. Fig. 2 represents a sheet of nine cakes rolled out with an embossed figure. Fig. 3 is a longitudinal section of Fig. 1, showing the construction and arrangement of the several parts. Fig. 4 is a central cross-section of the same.

The blocks heretofore used, engraven at a considerable cost, might be stereotyped, which, in itself, would be an improvement for multiplying the intaglio molds, but the tediousness in their use would still remain; but by means of dies or other modes in use, to have them formed in pure tin or other metal, backed up on the inside and formed into a cylinder, provided with a central shaft and handles, made in one piece at one end, the other end of the shaft to extend beyond the cylinder to enter a socket made in the end of the other handle, which may be secured by a collar, or otherwise, to constitute an embossing rolling-pin. These, once the die is had, could be produced at a trifling cost to supply the trade, embracing every variety of design and ornamentation.

I construct my rolling-pin as follows: A cylinder of wood, such as is shown at A in Figs. 3 and 4, is provided with a central bore, adapted to receive the detachable handles and shaft B B C. A sheet of pure tin, or some equivalent metal, of a width exactly corresponding to the length of the wooden cylinder, and long enough to be wrapped around said cylinder, and allow the edges to meet, is then submitted to the operation of an embossing-roll, by which intaglio figures of suitable design, separated from each other by raised edges, are stamped in the metal upon one surface. This sheet of metal, so prepared, is then wound or bent tightly around the wooden cylinder already described, and its edges, when they meet, are neatly joined. This arrangement is clearly shown in Fig. 3. It is evident that by passing this rolling-pin over a sheet of dough the figures and designs upon the surface will be printed upon the dough, and the size and shape of each cake will be marked by the raised edges surrounding each figure, said edges being shown at a, Fig. 3.

I do not broadly claim an embossing or ornamented rolling-pin, for such is shown in the design patent of John Holt, No. 141, December 10, 1861; nor do I claim a rolling-pin having a smooth surface roller or cylinder, with a central shaft provided with handles attached, as such is seen in the patent of Wm. Thomas, No. 119,062, September 19, 1872. But I am not aware that metallic plates provided with embossing figures, made by means of the ordinary embossing machinery, were ever before used when formed into cylinders, and provided with handles, as herein set forth, in order to supply the trade with any number made from the same dies. The novelty consists in the combination of an embossing-cylinder around a central shaft, provided with handles to constitute the rolling-pin. In other words,

What I claim as my improved rolling-pin is—

As a new article of manufacture, a rolling-pin having a body or core composed of a wooden cylinder, provided with a central bore to receive a detachable shaft, the latter having handles at each end, said cylinder being covered with a sheet of metal having ornamental designs stamped on its surface in intaglio, each figure being bounded or separated from the others by raised edges, substantially as shown and described.

LOUIS BLAUL.

Witnesses:
W. B. WILEY,
JACOB STAUFFER.